JOSEPH B. POTTER.
Improvement in Automatic Governor Valves.
No. 119,405.  Patented Sep. 26, 1871.
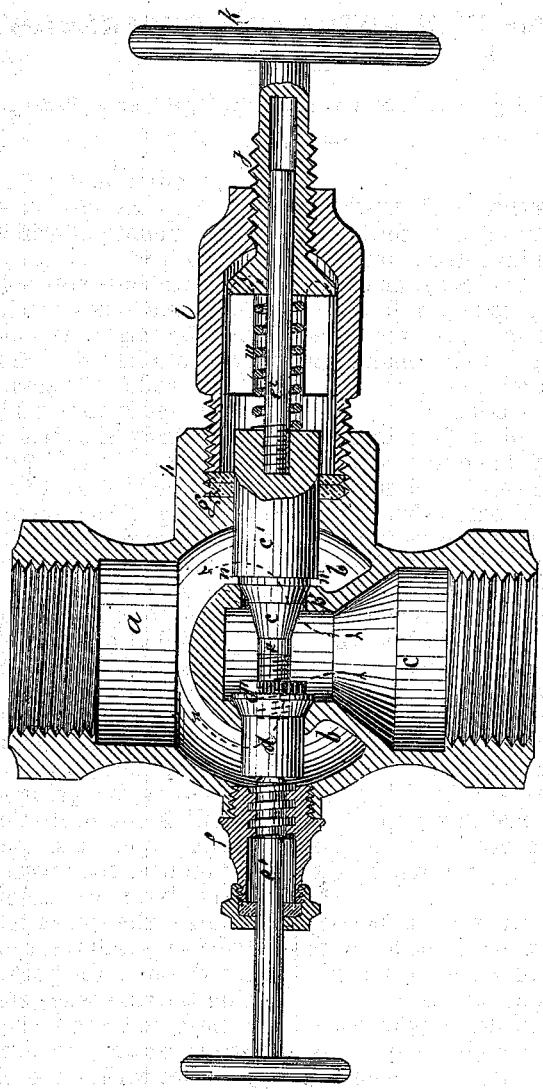

& #119,405

UNITED STATES PATENT OFFICE.

JOSEPH B. POTTER, OF CONNEAUTVILLE, PENNSYLVANIA.

IMPROVEMENT IN AUTOMATIC GOVERNOR-VALVES.

Specification forming part of Letters Patent No. 119,405, dated September 26, 1871.

*To all whom it may concern:*

Be it known that I, JOSEPH B. POTTER, of Conneautville, in the county of Crawford and State of Pennsylvania, have invented a new and Improved Automatic Governor-Valve; and I do hereby declare the following to be a full, clear, and exact description of the same, reference being had to the accompanying drawing making a part of this specification, in which—

Figure 1 is a longitudinal section.

This invention has for its object, first, to automatically regulate the flow of steam from a boiler to the steam-chest of an engine in such manner as to reduce the volume of the flow directly as the pressure in the boiler, so as to preserve a nearly constant pressure in the steam-chest; and, second, to equilibrate the pressure upon the governor-valve from the steam-chest by means of a counter-spring, which yields when the flow of steam from the steam-chest is momentarily checked by the arrival of the slide-valve at the center of its throw, and the consequent closing of both ports, and returns when the slide-valve passes to either end of its throw, so as to open one of the ports, and by this alternate yielding and returning maintains a continual oscillation of the governor-valve, thus preserving the constancy of the pressure in the steam-chest.

Referring to the drawing, $a$ is the valve-case; $b$, the trap in the case, into which steam enters from the boiler; $c$, the annular space in the lower part of the case surrounding the trap $b$, into which space steam enters through a port, $b'$, in the side of the trap $b$, which port is occupied by a valve, $c$, of conical shape, the port, however, being cylindrical. In the opposite side of the trap $b$ is an orifice, in which is placed a closely-fitting cylindrical plug, $d$, having at its inner end a beveled flange, $d'$, which insures a tight fit. The plug $d$ is connected by a stem, $e$, with the valve $c$. A threaded stem, $e^1$, extends from the outer end of the plug $d$ and passes through a nut, $f$, attached to the side of the case $a$, and has a hand-wheel, $f'$, secured to its outer extremity. The function of the threaded stem and nut is merely to open the valve $c$ at the starting of the engine. The valve $c$ forms the conical inner end of a plug, $c'$, which works in a stuffing-box, $g$, placed within a ring, $h$, that is cast upon the opposite side of the case $a$ from the nut $f$.

To the outer end of the plug $c'$ is attached a stem, $e^2$, in the same line with the stems $e$ $e^1$, the outer extremity of which stem enters an orifice made to receive it in the center of the face of a head, $i$, which is cast solid with a threaded stem, $j$, that has a hand-wheel, $k$, at its outer extremity. A tubular cage, $l$, is screwed at one end into the ring $h$, and has a central orifice in its other end through which the stem $j$ passes, the stem $e^2$ being inclosed within said cage. A spiral spring, $m$, surrounds the stem $e^2$ within the cage $l$, the extremities of said spring bearing against the plug $c'$ and the head $i$. By means of the stem $j$ the spring $m$ can be more or less compressed. An annular shoulder, $n$, is formed on the plug $c'$ next to the butt of the cone $c$. The spring $m$ should be of a strength to equilibrate the average pressure exerted upon the outer end of the plug $d$, and also upon the shoulder $n$, by the steam in the chest. When the slide-valve is at the center of its throw, and consequently has closed both ports so that no steam escapes from the chest, the pressure therein increases and moves the plug $d$ and valve $c$ outward slightly, thereby compressing the spring $m$. When the slide-valve is at either end of its throw and one port is consequently open, the escape of steam from the chest reduces the pressure therein, and the plug $d$ and valve $c$ are therefore returned by the expansion of the spring $m$. This oscillation of the valve $c$ so regulates the flow of steam into the chest through the port $b'$, shutting it partly off during the time when steam is not escaping from the chest, and letting it on during the time when steam is escaping from the chest, as to maintain a pressure within the chest as nearly constant as possible.

The area of the inner end of the plug $d$, outside the stem $e$, should be to the area of the port $b'$ as sixteen to fifteen. Hence, whenever the pressure in the boiler is raised, it moves the plug $d$ outward and draws the valve $c$ inward, thus diminishing the size of the port $b'$ and preventing the increased pressure in the boiler from producing an increase of pressure in the steam-chest. When the pressure in the boiler diminishes, the converse takes place. The taper of the valve $c$ should be such that when it is open half its length the port $b'$ is nine-sixteenths open, and when the valve $c$ is open three-quarters of its length, the port $b'$ is one-half open. This gradation insures a uniformity in the volume of the flow through the port $b'$, as great a quantity in the same time passing through the latter when one-eighth open under the increased pressure, as when one-half open under the diminished pressure.

Having thus described my invention, what I claim as new, and desire to secure by Letters Patent, is—

1. The plug $d$ and conical or taper valve $c$, the former having a greater area than the latter, and connected, as shown and described, in combination with the spring $m$, to operate in the manner specified.

2. The plugs $d$ $c'$, valve $c$, shoulder $n$, and spring $m$, working in connection with each other, as described.

To the above specification of my invention I have signed my hand this 5th day of August, A. D. 1871.

JOSEPH B. POTTER.

Witnesses:
THOS. D. D. OURAND,
SOLON C. KEMON.

(72)